Figure 1:
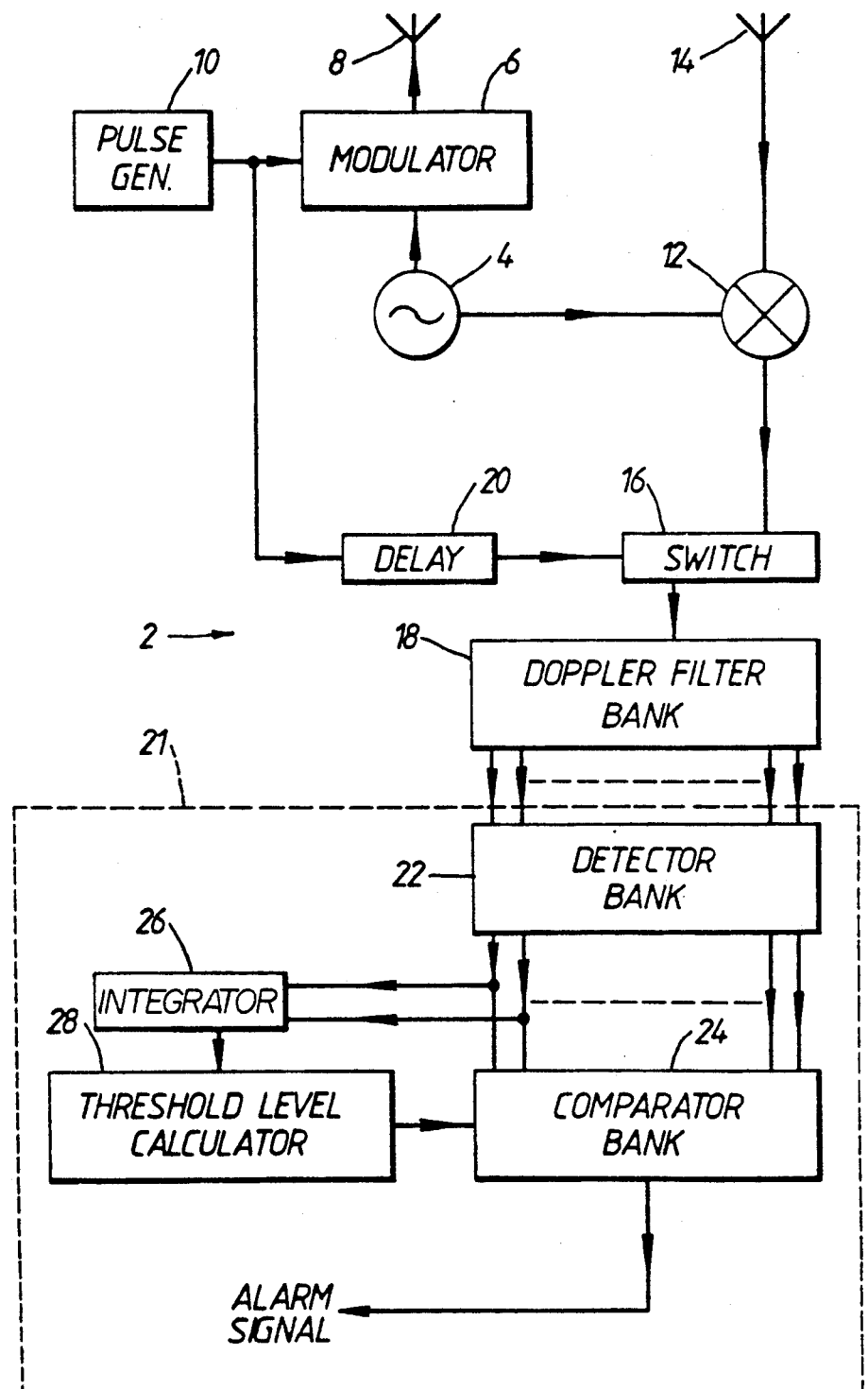

United States Patent [19]
Hurd

[11] Patent Number: 5,021,791
[45] Date of Patent: Jun. 4, 1991

[54] RADAR SYSTEMS
[75] Inventor: David L. Hurd, Hampshire, England
[73] Assignee: GEC-Marconi Limited, Stanmore, England
[21] Appl. No.: 809,862
[22] Filed: Oct. 31, 1985
[30] Foreign Application Priority Data
  Nov. 2, 1984 [GB] United Kingdom ............ 8427745
[51] Int. Cl.[5] ................................. G01S 13/536
[52] U.S. Cl. ............................. 342/93; 342/200
[58] Field of Search .................. 342/93, 200, 201
[56] References Cited
  U.S. PATENT DOCUMENTS
  4,047,172  9/1977  Bauer et al. ............ 342/201 X
  4,137,532  1/1979  Taylor, Jr. et al. ............ 342/93
  4,488,154 12/1984  Ward ....................... 342/93 X Primary Examiner—T. H. Tubbesing
Attorney, Agent, or Firm—Fleit, Jacobson, Cohn, Price, Holman & Stern

[57] ABSTRACT

A radar system comprises a radar carrier frequency oscillator for producing a radar carrier signal, a receiver including a mixer for producing Doppler signals, a Doppler filter bank and an alarm circuit, including a series of Doppler bins, having an alarm threshold level. The radar system is provided with a frequency modulator for modulating the radar carrier signal and any interference signal received by the receiver whereby the bandwidth of the frequency modulated interference signal exceeds the bandwidth of a number of Doppler filters in the Doppler filter bank. The alarm circuit may have two threshold levels and may be controlled in dependence upon a predetermined pattern of crossings of the threshold levels.

13 Claims, 2 Drawing Sheets

RADAR SYSTEMS

The present invention relates to radar systems and a method of rejecting false alarms in radar systems.

Generally, there are two types of coherent radar system; continuous wave radar systems and pulse Doppler radar systems. Both types of system usually incorporate a bank of Doppler filters and a corresponding number of Doppler bins. When a target is detected by the system the target return energy, in the form of a Doppler frequency, is passed by one (or possibly two) of the Doppler filters and is contained in one (or two) of the Doppler bins. The presence of the Doppler frequency in a Doppler bin indicates the existence of the target to an operator of the system, or to an automatic detection system.

However, with such systems, interference from an extraneous source may, to an operator or automatic detection system, appear indistinguishable from a genuine target, causing a false alarm. False alarms may be indicated if the interference signal from the extraneous source, after being mixed down to the Doppler frequency band, contains at least one spectral component whose frequency falls within the expected Doppler frequency band for genuine targets and whose bandwidth is less than the resolution of a single Doppler filter in the Doppler filter bank. When this occurs the interference signal, or a spectral component of the signal, is passed by the relevant Doppler filter and is contained in a single Doppler bin, causing an indication to be given to an operator or automatic detection system which is similar to the indication for a genuine target. Such false alarms are particularly inconvenient when immediate and drastic action is necessary when an alarm is indicated.

The bandwidth of a spectral component is approximately equal to the sum of the bandwidths of the two components which mixed together to produce it; namely one component in the radar spectrum and one component in the interference spectrum. Thus, if the interference is coherent (that is, it contains narrow spectral lines) as well as the radar signal, there is a possibility of false alarms for both pulsed and continuous wave radar systems in the presence of either pulsed or continuous wave interference.

If the radar system employs sampling as is usual for pulse Doppler radar systems, false alarms may also be caused by the coherent interference aliasing into the band of Doppler frequencies which would be detected from genuine targets. Such aliasing of the interference signal can occur because the sampling process at the higher frequencies can generate a lower frequency signal which falls within the band of Doppler frequencies. This lower frequency signal may be passed by the Doppler filters into a Doppler bin, giving a false alarm.

It is an aim of the present invention to provide a radar system in which false alarms arising from interference may be distinguished readily from alarms generated in response to genuine targets.

It is also an aim of the present invention to provide, in a radar system, a method of rejecting false alarms arising from interference.

Accordingly, there is provided a radar system comprising a radar carrier frequency oscillator for generating a radar carrier signal for transmission to a target, receiving means for receiving a radar carrier signal reflected from the target, mixer means for mixing the generated and received radar carrier signals to produce a Doppler signal, a Doppler filter bank having a plurality of Doppler filters, alarm means, having a plurality of Doppler bins and an alarm threshold level, for signalling an alarm when the magnitude of a Doppler signal fed thereto exceeds the threshold level, and frequency modulating means for producing a modulating signal having a peak to peak frequency deviation for frequency modulating the generated radar carrier signal and for frequency modulating any interference signal received by the receiver means such that the bandwidth of the frequency modulated interference signal exceeds the combined bandwidth of a number of the Doppler filters in the Doppler filter bank.

The alarm means may comprise upper and lower alarm threshold levels and logic means is provided for controlling the operation of the alarm means in response to the detection of a predetermined pattern of crossings of the upper and lower threshold levels by Doppler signals.

Preferably the predetermined pattern of crossings comprises a crossing in a Doppler bin of the upper threshold level at a Doppler frequency f in combination with no other crossing apart from one in an immediately adjacent Doppler bin of the lower threshold level within a frequency band corresponding to the peak to peak frequency deviation of the modulating signal produced by the modulating means and disposed symmetrically about the Doppler frequency f.

The Doppler filters in the Doppler filter bank may have a bandwidth of 200 Hz and the modulating signal produced by the frequency modulating means may have a peak to peak frequency deviation of 800 Hz.

The frequency modulating means may be arranged to provide a modulating signal of sinusoidal waveform.

The frequency modulating means may be arranged to provide a modulating signal of noise-like random waveform.

The bandwidth of the frequency modulated interference signal may be equal to at least the combined bandwidth of all the Doppler filters in the Doppler filter bank.

Accordingly, there is also provided a method for rejecting false alarms in a radar system employing a Doppler filter bank having a plurality of Doppler filters, mixer means for generating Doppler signals from generated and received radar carrier signals, and alarm means having a plurality of Doppler bins an alarm threshold level, the method comprising generating a frequency modulating signal having a peak to peak frequency deviation to frequency modulate the radar carrier signal and to frequency modulate any interference signal received by the radar system such that the bandwidth of the frequency modulated interference signals exceeds the combined bandwidth of a number of Doppler filters in the Doppler filter bank.

Preferably, the method comprises providing the alarm means with upper and lower threshold levels, detecting the crossings of the upper and lower threshold levels by Doppler signals, and controlling the activation of the alarm means in response to the detection of a predetermined pattern of crossings of the upper and lower threshold levels by the Doppler signals.

Preferably, the alarm means is not activated on the detection in a Doppler bin of a signal of a Doppler frequency f and having a magnitude which crosses the upper threshold level in combination with the detection of a further signal having a magnitude crossing the lower threshold level, the further signal having a frequency within a frequency band corresponding to the peak to peak frequency deviation of the frequency modulating signal and disposed symmetrically about the Doppler frequency f of the signal detected to cross the upper threshold level, but not in an immediately adjacent Doppler bin. The interference signals may be modulated by generating a modulating signal having a peak to peak frequency deviation of 800 Hz.

The modulating signal may be of sinusoidal waveform.

The modulating signal may be of random noise-like waveform.

The interference signal may be modulated such that the bandwidth of the frequency modulated interference signal is equal to at least the combined bandwidth of the Doppler filters in the Doppler filter bank.

Figure 2:
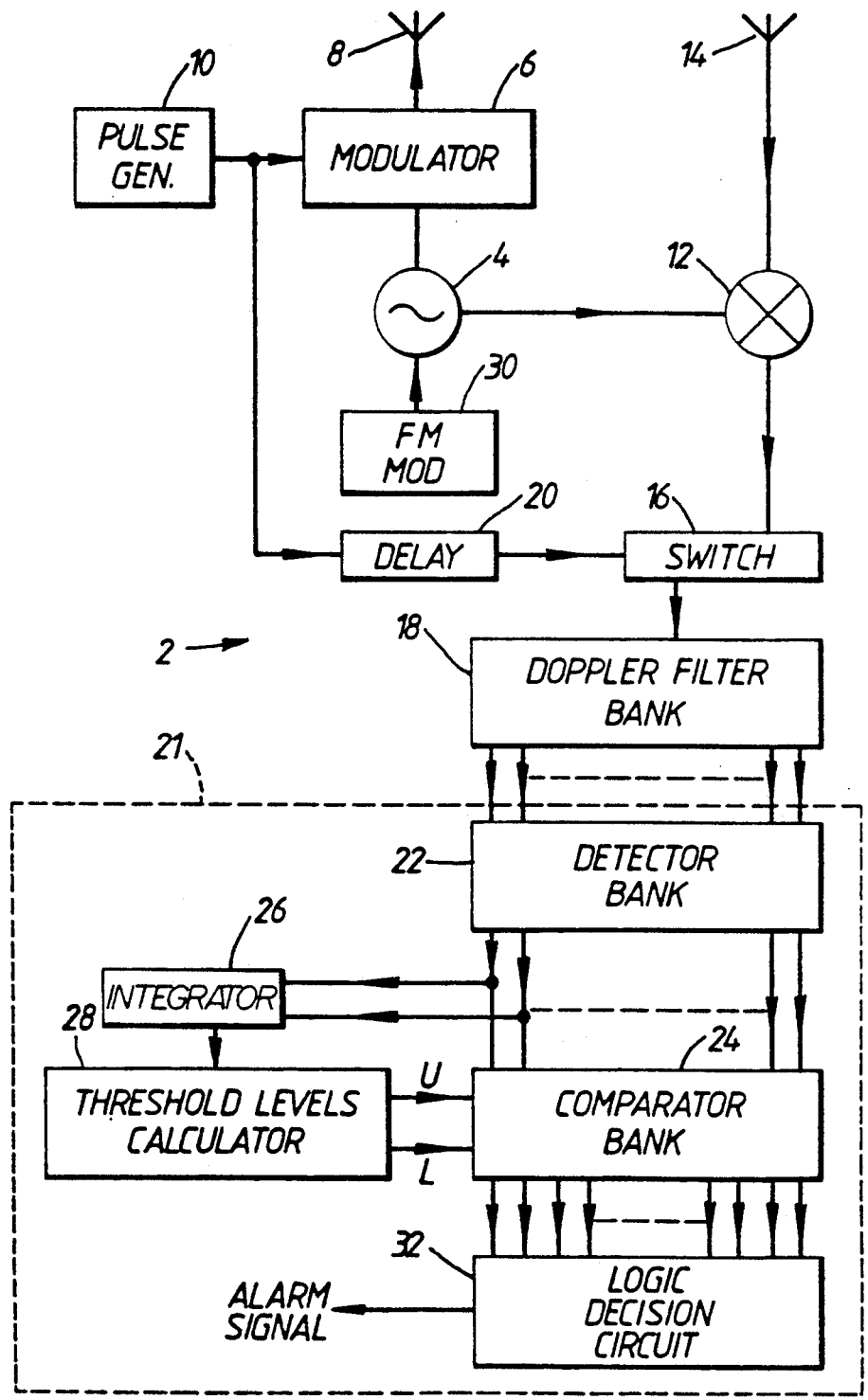

The present invention will now be described, by way of example, with reference to the accompanying drawings in which like reference numerals have been used to designate like elements and in which, FIG. 1 illustrates a block schematic diagram of a prior art radar system and FIG. 2 illustrates a block schematic diagram of a radar system in accordance with the present invention.

Referring to the drawings, a pulse Doppler radar system 2 comprises a coherent oscillator 4 for generating a radar carrier signal. The generated radar carrier signal is fed via a modulator 6 to a transmit antenna 8 for transmission to a target.

The modulator 6 is controlled by a pulse generator 10 such that short pulsed bursts of the radar carrier signal generated by the oscillator 4 are transmitted by the transmit antenna 8. The radar system 2 also includes a receiver which is provided with a mixer 12 and a receive antenna 14. The radar signals reflected from the target are detected by the receive antenna 14 and fed to the mixer 12. The mixer 12 is also connected to the oscillator 4 and receives the radar carrier signal generated by the oscillator 4. The output of the mixer 12 is fed via a switch 16 to a Doppler filter bank 18. The operation of the switch 16 is controlled by a time delay 20 which is connected to a the pulse generator 10. The time delay 20 functions to compensate for the time taken for the transmitted radar carrier signal to go to and return from the target.

The Doppler filter bank 18 comprises a series of Doppler filters, each filter having a preset frequency resolution, that is each filter in the filter bank has a preset bandwidth.

The Doppler filter bank 18 is connected to alarm means 21 which includes a detector bank 22. The detector bank 22 comprises a series of detectors usually known as Doppler bins. In the prior art system shown in FIG. 1, the alarm means 21 has a constant false alarm rate (CFAR) threshold and further comprises a comparator bank 24.

The CFAR threshold level for the system is normally determined by summing the noise levels in the Doppler bins in the detector bank 22 in a integrator 26 and determining the mean of the summed noise levels and multiplying this by a known constant in the threshold level calculator 28.

In operation, a radar carrier signal generated by the oscillator 4 is transmitted via the transmit antenna 8 to a target. The signal reflected from the target is received by the receive antenna 14. With a moving target, the signal received by the receive antenna 14 and the signal transmitted by the transmit antenna 8 will have a frequency difference which is dependent upon the speed of the target. When these signals are mixed in the mixer 12 a Doppler signal is produced, the frequency of which is an indication of the target speed. The Doppler signal is fed via a filter in the Doppler filter bank 18 to a Doppler bin in the detector bank 22 and then to the comparator bank 24. If the magnitude of the signal fed to the comparator bank is greater than the CFAR threshold level, that is, a crossing of the CFAR threshold level is detected, an alarm signal is generated and may be indicated to an operator of the system. The operator knows that the target is genuine as the indication is given in only one or two of the Doppler bins.

However, as described previously, interference signals from an extraneous source may be detected by the receive antenna 14. The interference may be processed by the system and may give rise to an alarm indication in a single Doppler bin when a genuine target is not present.

In the radar system in accordance with the present invention modulating means in the form of an FM modulator 30 is provided to frequency modulate the oscillator 4, as shown in FIG. 2.

If the frequency resolution of each Doppler filter in the Doppler filter bank 18 is F the frequency modulation applied by the FM modulator 30 is such that the instantaneous frequency of the oscillator in the FM modulator 30 changes by at least several multiples of F during a time period of $1/F$. The choice of FM waveform shape of the FM modulator 30, such as a sinusoidal or noise like random waveform is determined by the particular application of the system: the principle remains the same provided the above criterion is satisfied.

The modulated output of the oscillator 4 is afforded to the mixer 12. The effect of the frequency modulation on any interference signal which is received by the system and fed to the mixer is to extend the energy spectrum (that is, bandwidth) of the interference signal, such that it is greater than the frequency resolution of a Doppler filter in the Doppler filter bank 18. Hence, the interference signal is passed by a number of the Doppler filters, the magnitude of the output of each Doppler filter compared to the CFAR threshold, and an indication given in a number of the Doppler bins in the detector bank 22. The operator can, therefore, distinguish between interference and a genuine target, because with a genuine target, the indication is given in one or two Doppler bins.

The effect of the frequency modulation on a radar return from a genuine target will be different from the effect of such modulation on the interference signal due to the correlation of the frequency modulation provided by the FM modulator 30 on the generated and received radar carrier signals. The degree of correlation will depend upon the round trip delay to the target. However, for all but long range targets the degree of correlation will be sufficient for the target return energy to be contained within a single Doppler bin. The range of the system to maintain sufficient correlation may be determined easily knowing the frequency resolution of the Doppler filters in the Doppler filter bank 18 and the peak to peak frequency deviation of the frequency modulating waveform generated in the FM modulator 30.

For example, assume the frequency resolution F of the Doppler filters to be 200 Hz and sinusoidal frequency modulation of period 5 milliseconds and peak to peak frequency deviation of 800 Hz is applied by the FM modulator 30. The target signal will be spread over a bandwidth of 4F sin FTd. The latter bandwidth is only greater than 200 Hz for a round trip delay Td greater than 400 microseconds, that is, a range greater than 60 kilometers. Hence, if the above parameters are chosen with a system range of 60 kilometers, a genuine target would be indicated in one or two Doppler bins whereas interference would be indicated in at least four Doppler bins.

It can be seen, therefore, that interference and targets (within the working range of the system) are clearly distinguishable on the basis of Doppler spectrum if such frequency modulation is applied. Practical design requirements may require that the deviation of the frequency modulation which is applied is sufficient to ensure that the bandwidth of the interference is spread such that it covers the combined frequency resolution of the Doppler bins. Long range detection requirements may also define the deviation of the frequency modulation which is applied.

The radar system of the present invention may be further improved by incorporating logic means in the receiver which utilizes processing techniques to distinguish targets from interference whose Doppler spectrum has been extended by the frequency modulation.

The logic means, in the form of a logic decision circuit 32 may control the alarm means 21 in response to the detection of a predetermined pattern of crossings of the CFAR threshold. For example, a crossing of the CFAR threshold level may be detected at a Doppler frequency f. However, the logic decision circuit 32 may be programmed to recognize this crossing of the threshold level as a genuine target only if no other crossings of the threshold level, apart from one crossing in an immediately adjacent Doppler bin, are detected within a frequency band centered on the detected Doppler frequency f and having a bandwidth equal to the peak to peak frequency deviation of the signal generated by the FM modulator 30. However, such processing by the logic decision circuit 32 may not be satisfactory in all applications of the radar system as, when the interference signal increases in magnitude with respect to the noise inherent in the system, for example, due to the range of the source of the interference decreasing, there may be a reasonable probability that the first instance of a crossing of the CFAR threshold level would be present in one Doppler bin only, resulting in a false alarm.

This problem may be alleviated by providing the alarm means 21 with upper and lower threshold levels. The upper threshold level may correspond to the CFAR threshold level as defined by an acceptable false alarm rate. The logic decision circuit may be programmed to control the alarm means 21 so as to indicate the presence of a target only when a predetermined pattern of crossings of the upper and lower threshold levels is detected. For example, an indicated target may be deemed to be genuine only if a crossing of the upper threshold level is detected at a Doppler frequency f and there are no crossings of the lower threshold level, apart from one crossing in an immediately adjacent Doppler bin, within a frequency band disposed symmetrically about the Doppler frequency f and having a bandwidth (FD) equal to the peak to peak frequency deviation of the FM signal produced by the FM modulator 30. This reduces substantially the number of false alarms associated with the adoption of a single alarm threshold level since the probability of the interference signal causing a crossing of the upper threshold level without also causing a crossing of the lower threshold level in a neighboring Doppler bin is small.

The lower threshold level may be determined by considering the probability of overruling a genuine target due to noise in the system causing a crossing of the lower threshold in one or more of the Doppler bins within the frequency band of bandwidth FD. However, this probability will be small compared with one minus the required detection probability.

Although the present invention has been described with reference to a particular embodiment it is to be understood that variations may be made within the scope of the invention, for example, the radar system may be a continuous wave radar system.

I claim:

1. A radar system comprising a radar carrier frequency oscillator for generating a radar carrier signal for transmission to a target, receiving means for receiving a radar carrier signal reflected from the target, mixer means for receiving and mixing the generated and received radar carrier signals to produce a Doppler signal, a Doppler filter bank having a plurality of Doppler filters and arranged to receive Doppler signals produced by the mixer means, alarm means coupled to the Doppler filter bank and having a plurality of Doppler bins and an alarm threshold level circuit for signalling an alarm when the magnitude of a Doppler signal offered thereto from the Doppler filter bank exceeds the alarm threshold level, and frequency modulating means for producing a modulating signal having a peak to peak frequency deviation for frequency modulating the generated radar carrier signal and for frequency modulating any interference signal received by the receiving means such that the bandwidth of the frequency modulated interference signal exceeds the combined bandwidth of a number of the Doppler filters in the Doppler filter bank.

2. A radar system according to claim 1 wherein the alarm means comprises an upper and lower alarm threshold level circuit and logic means is provided for controlling the operation of the alarm means in response to the detection of a predetermined pattern of crossings of the upper and lower alarm threshold levels by Doppler signals afforded to the alarm means.

3. A radar system according to claim 2 wherein the logic means comprises means for detecting the predetermined pattern of crossing of the upper and lower alarm threshold levels according to a crossing in a Doppler bin of the upper alarm threshold level at a Doppler frequency f in combination with no other crossing, of an alarm threshold level apart from one crossing in a Doppler bin immediately adjacent to the Doppler bin in which the crossing of the upper alarm threshold level occurs, of the lower alarm threshold level and within a frequency band corresponding to the peak to peak frequency deviation of the modulating signal produced by the modulating means and disposed symmetrically about the Doppler frequency f.

4. A radar system according to claim 1 wherein the Doppler filters in the Doppler filter bank have a bandwidth of about 200 Hz and the modulating signal provided by the frequency modulating means has a peak to peak frequency deviation of about 800 Hz.

5. A radar system according to claim 4 wherein the frequency modulating means comprises means for providing a modulating signal of sinusoidal waveform.

6. A radar system according to claim 4 wherein the frequency modulating means comprises means for providing a modulating signal of noise-like random waveform.

7. A radar system according to claim 1 wherein the frequency modulating means comprises means for frequency modulating any interference signal received by the receiving means such that the frequency modulated interference signal has a bandwidth equal to at least the combined bandwidth of all the Doppler filters in the Doppler filter bank.

8. A method for rejecting false alarms in a radar system employing a Doppler filter bank having a plurality of Doppler filters, mixer means for generating Doppler signals from generated and received radar carrier signals, and alarm means comprising a plurality of Doppler bins having an alarm threshold level, the method comprising generating a frequency modulating signal having a peak to peak frequency deviation to frequency modulate the radar carrier signal and to frequency modulate any interference signal received by the radar system whereby the bandwidth of any frequency modulated interference signal exceeds the combined bandwidth of a number of Doppler filters in the Doppler filter bank.

9. A method according to claim 8 comprising providing the alarm means with upper and lower threshold levels, detecting crossings of the upper and lower threshold levels by Doppler signals, and controlling the activation of the alarm means in response to the detection of a predetermined pattern of crossings of the upper and lower threshold levels by the Doppler signals.

10. A method according to claim 9 wherein the activation of the alarm means is controlled in a manner such that the alarm means is inhibited on the detection in a Doppler bin of a signal of a Doppler frequency f and having a magnitude which crosses the upper alarm threshold level in combination with the detection of a further signal having a magnitude sufficient to cause a crossing of the lower threshold level, the further signal having a frequency within a frequency band corresponding to the peak to peak frequency deviation of the frequency modulating signal and disposed symmetrically about the Doppler frequency f of the signal detected to cross the upper threshold level, but not occurring within the bandwidth of a Doppler bin immediately adjacent to the Doppler bin in which the signal of Doppler frequency f is detected.

11. A method according to claim 9 wherein the step of generating a frequency modulating signal, comprises generating a signal of sinusoidal waveform.

12. A method according to claim 9 wherein the step of generating a frequency modulating signal comprises generating a signal of random noise-like waveform.

13. A method according to claim 9 wherein the step of generating a frequency modulating signal comprises frequency modulating any interference signal in a manner such that the bandwidth of the frequency modulated interference signal is equal to at least the combined bandwidth of all the Doppler filters in the Doppler filter bank.

* * * * *